Dec. 26, 1950      M. WALLACE      2,535,107

NAVIGATIONAL SYSTEM

Filed April 19, 1946      7 Sheets-Sheet 1

Inventor
MARCEL WALLACE
By Hyman Hurwitz
Attorney

Dec. 26, 1950 M. WALLACE 2,535,107
NAVIGATIONAL SYSTEM
Filed April 19, 1946 7 Sheets-Sheet 2

Inventor
MARCEL WALLACE
By Hyman Hurwitz
Attorney

Dec. 26, 1950　　　　M. WALLACE　　　　2,535,107
NAVIGATIONAL SYSTEM

Filed April 19, 1946　　　　　　　　　　　7 Sheets-Sheet 5

Inventor
MARCEL WALLACE
By Hyman Hurwitz
Attorney

FIG. 10

UNITED STATES PATENT OFFICE 2,535,107

NAVIGATIONAL SYSTEM

Marcel Wallace, Fairfield County, Conn., assignor, by mesne assignments, of one-half to Panoramic Radio Corporation, New York, N. Y., a corporation of New York Application April 19, 1946, Serial No. 663,316

26 Claims. (Cl. 343—112)

This invention relates to improvements in panoramic systems for indicating simultaneously the elevations and the relative locations with respect to an airway of one or more aircraft.

It is an object of the invention to provide a system for indicating to the operator of an aircraft or to a ground monitoring station not only the presence and the relative altitudes of a plurality of aircraft, as is provided for in the system disclosed in the co-pending joint application for United States patent of Marcel Wallace and William Leu-Leang Wu, Serial Number 633,138, filed December 6, 1945, now Patent No. 2,005,314, granted April 25, 1950, and of which this application is a continuation-in-part, but to improve the latter system by providing means auxiliary thereto which enable determination of relative positions with respect to a given course of all the craft on the airway.

It is a further object of the invention to provide a system of the above character, in which the indications of altitude or of relative altitude may be suitably modified to provide information indicating the relation of each aircraft to an airway, or of the course of each aircraft, course information being provided by suitable beacon station.

It is well known that present day airways are conventionally set up with two or more overlapping radio beams, the equipotential lines of intersection of the beams constituting the center line of the airway. The separate over-lapping beams may, in certain known systems, be suitably modulated to enable operators of aircraft to distinguish between them, and to determine a course of travel which is either to the right or to the left of the above-mentioned equipotential line or directly thereron. It has been a common practice to modulate one of the beams constituting an airway by code signals corresponding to the letter A, the other being modulated with signals corresponding to the letter N; the A-N signals being so timed as to interlock, whereby at the equipotential zone both signals combine to provide a continuous tone of unvarying amplitude. On the other hand, aircraft which are to the right or to the left of the equipotential line will be provided with predominant A or N signals, depending upon whether the aircraft are to the right or to the left of the given line. It will be understood that craft flying in opposite direction along a given line may be constrained to travel on opposite sides of the line, in order to avoid the possibility of collision between craft traveling in opposite directions.

Another conventional type of airway is one in which two or more overlapping radio beams may be transmitted, the equipotential lines of intersection of each pair of beams constituting the center line of an airway, and each beam being modulated with signals of a different frequency. Instruments are provided aboard craft utilizing the beacon system for receiving radio signals deriving from a pair of overlapping radio beams and for determining the relative amplitudes of modulating signals derived from the radio signals as a measure of course deviation from the equipotential lines previously described.

There has been proposed still another type of beacon system, for use as an aid to aerial navigation, which provides for continuous indications aboard any craft utilizing the beacon system, of the angular of azimuthal relation of that craft relative to a predetermined line of zero azimuth. This system, which the Civil Aeronautics Authority appears to favor, requires the omni-directional transmission of a carrier modulated with a 60 cycle signal, which serves as a reference signal, and the further transmission of a rotating directional pattern of radiant energy, the rate of rotation of the directional pattern being 60 cycles, and the phase of rotation being locked with respect to the phase of the reference omni-directional signal. In such a system a measurement aboard a craft of the relative phase of 60 cycle signals derivable from the rotating directional pattern, and from the signal of identical frequency derivable from the omni-directional transmission, enables determination of azimuthal relation of the craft with respect to the beacon system.

It is, accordingly, still a further object of this invention to provide means for indicating on stratoscope apparatus, such as is described and claimed in the above-mentioned co-pending application, the relationship of each craft, the altitude of which is indicated on the stratoscope apparatus, to courses such as have been above defined or to similar or analogous courses. The term stratoscope is defined to mean a device for visually indicating strata occupied by, or altitudes of, aircraft. In this manner the operator of each craft which is traveling on a given airway, or between predetermined points, or on a predetermined area, may be provided with an indication of the relative altitudes of adjacent craft, and of the relative positions of such craft with respect to a predetermined course line, or of the directions of travel of such craft, and may be constrained to take proper measures to avoid collision with craft traveling adjacent his own craft and at a proximate altitude.

It will be understood that while airways and radio beacons may be set up in various manners, and while I have disclosed, for purposes of illustration only, the application of my novel inventions to airways and beacons of one specific character, that I do not desire to be limited to such application, but consider my inventions as herein disclosed to have application to beacon systems and airways of any character whatsoever.

In its broadest scope my invention may be considered as a telemetric system, enabling the transmission from each of a plurality of points of a plurality of data simultaneously, and enabling the simultaneous indication at another point or at other points of the pluralities of data transmitted.

While I have illustrated and described my system as directed to a system for transmitting paired altitude and course indications from each of a plurality of aircraft, and for receiving aboard each of said aircraft the altitude-course signals deriving from the various craft and for translating a plurality of such signals into simultaneously visible indications, it will be clear that, in its broader aspects my system may be utilized for transmitting information of other character, if desired, in the form of paired data.

Transmission via radio, which is extremely convenient in the case of aircraft, or in the case of surface craft, may be totally inapplicable in the event it is desired to utilize my invention for transmitting information from an underwater source, such as a submarine. In the latter case, supersonic or sonic transmissions may be utilized, of a character now generally known and understood. Likewise, in the case of industrial applications, transmission may take place over wires, or transmission line or by induction as distinguished from radiation.

It is, accordingly, a further object of my invention to provide a telemetric system wherein pairs of data are transmitted in the form of pulses, timed in accordance with one of the data and modulated in accordance with another of the data.

It is still another object of my invention to provide a telemetric system wherein a variable reference value may be indicated distinct from a plurality of further indications related thereto, but in convenient juxtaposition thereto.

It is still a further object of the invention to provide indications on the face of a cathode ray oscilloscope of a plurality of paired data, in the form of indications with respect to a pair of coordinates simultaneously.

The above and still further objects and advantages of my invention will become apparent upon study of the following detailed description of various specific embodiments and applications of my invention, when taken in conjunction with the accompanying drawings. The scope of the invention, as distinct from the specific embodiments herein disclosed, is defined in the appended claims.

Figure 1:
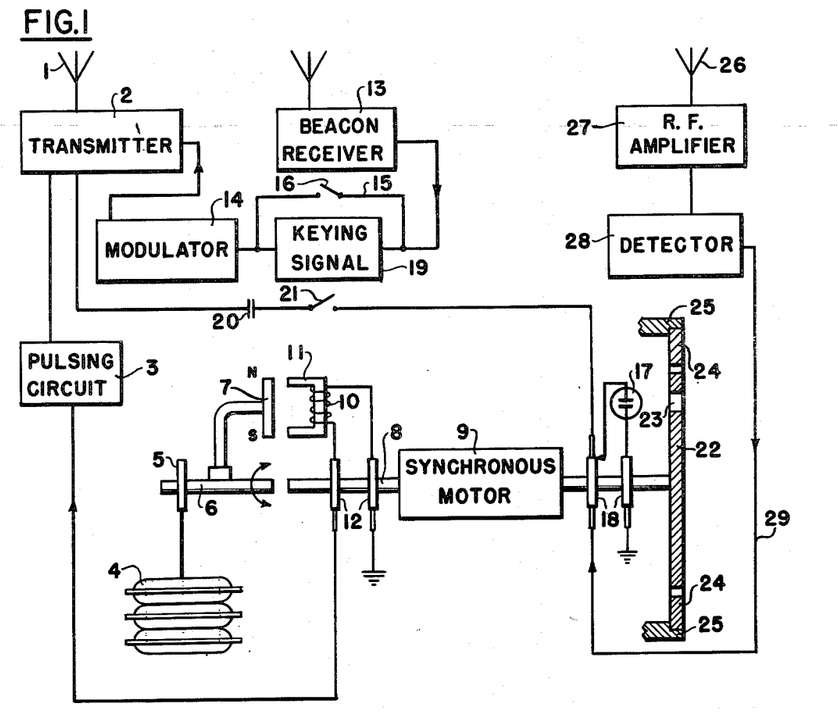
Figure 1 illustrates schematically and in block diagram an instrument which may be carried on aircraft for indicating to the operator of the aircraft the relative altitudes and courses of a plurality of craft equipped with similar instruments, and for transmitting signals indicative of its own altitude and course, indications being provided by a single rotating neon cell.

Referring specifically to Figure 1 of the drawings, there is illustrated a device which, installed in an aircraft, transmits to all craft which may be equipped with similar devices information as to the altitude of the device and of its left-right position relative to a defined course. The equipment illustrated is further capable of simultaneously receiving and translating similar information received from a one or more aircraft.

The device of Figure 1 comprises a transmitter antenna 1, energized from a transmitter 2 which is tuned to a suitable frequency, the identical frequency being utilized by all similar equipments operating on a given airway. The transmitter 2 is normally quiescent and transmits only while energized by a pulse of energy provided by the pulser 3, which is controlled in turn by an altitude responsive device having the function of controlling the operation of the pulser 3.

The pulse time controlling circuit comprises an aneroid cell or similar atmospheric-pressure-responsive device 4 for positioning a rack 5 in accordance with the altitude of an aircraft, the rack 5 serving rotatably to position a shaft 6, from which extends radially a small permanent magnet 7. The magnet 7 will, by the action of the rack 5 and the cell 4, be constrained to take a position on the circumference of a circle, which corresponds with, and which may be calibrated in terms of, altitude.

A shaft 8 is rotated at a convenient relatively high constant speed by means of a synchronous motor 9, in alignment with the positionable shaft 8, said shaft 8 carrying a coil 10, preferably comprising a core 11, and which serves as a voltage pick-up in response to passage of the coil 10 past the permanent magnet 7. The pulse of voltage provided by the coil 10 during its traverse of the magnetic field provided by the permanent magnet 7 is applied via suitable slip rings and brushes 12 to the pulsing circuit 3.

It will be obvious that the time phase of the pulses transmitted by the equipment above described is a measure of altitude of the aircraft carrying the equipment. This craft, as is quite common at the present time, may be equipped with a beacon receiver and indicator, for indicating whether the craft is traveling to the right or the left of a given course, or directly on that course, in response to suitable radio beacon signals, which are supplied in conventional manner along the airway.

One type of course indication, which is well known to the art and therefore requires no detailed elucidation in this specification, involves two overlapping radio beams, the beams being respectively modulated in interlocked A–N rhythm. Reception aboard a craft of a series of coded letters A indicates that a craft is on one side of the course line, whereas reception of a series of coded N signals indicates position on the other side of the course line. The A and N signals interlock to provide a continuous unmodulated tone signal when the craft is directly in the center of the course.

In accordance with the present invention, a course receiver 13 is provided, which receives A–N signals and applies same to a modulator 14 via line 15, while manual switch 16 is closed. The modulator 14 serves to energize the transmitter 2 in accordance with the A–N rhythm of the signals provided by the receiver 13. Thereby the pulse output of the transmitter 2 is modulated in such manner as to provide information as to the side of the radio beacon course occupied by the signaling craft.

Mounted on the shaft 8 and rotating cophasally with the pick-up coil 10, is a neon filled indicator cell 17, which may be supplied with signal via the slip rings and brushes 18. The cell 17 may be coupled to the transmitter 2 via a line having connected therein a coupling condenser 20 and a manually operated switch 21.

The pulse rate of the transmitter 2 is normally sufficiently great to provide an apparently continuous illumination of the cell 17 at one point in its circular path of travel. The modulation provided by the modulator 14, however, interrupts the continuous illumination of the cell 17 in A–N rhythm, to indicate on which side of a course line the transmitting craft is located.

For convenience of observation the cell 17 may be provided with a disk 22, rotated by the shaft 8 and comprising a narrow elongated slot 23 opposite the cell 17.

The disc 22 rotates with respect to a scale 24 which may be secured to the casing 25, whereby interpretation of the angular position of the cell 17 when illuminated may be readily accomplished.

It is assumed that a plurality of aircraft on a common airway are provided with apparatus such as is schematically illustrated in Figure 1 of the drawings. The synchronous motors 9 aboard the various craft are synchronized by means of any suitable synchronizing system known in the art, and rotate the gas filled cells 17 and their associated discs 22 in exact time synchronization and in phase. Pulses transmitted by the various aircraft are intercepted by the antenna 26, amplified by the amplifier 27 and detected in the detector 28. Detected pulses are applied to the cell 17 via the line 29, the points in the cycle of rotation of the cell 17 at which illumination occurs being indicative of the altitudes of the various craft, and the modulation of that illumination in A or N rhythm indicating the location of each of the craft with respect to a course line.

Since courses may be set up along airways in various ways, the A–N system above described being but one such, I have provided devices for suitably modulating the transmitter 2 in accordance with left-right course indications which may operate independently of the character of the beacon signals. It is customary for beacon receivers operating in conjunction with various types of beacons now known in the art, to be arranged to provide output signals of one polarity in response to signals originating on one side of a given course, and signals of the opposite polarity in response to signals originating on the other side of the given course. Such signals may be applied to a left-right indicating meter for providing visual course indications.

Figure 5:
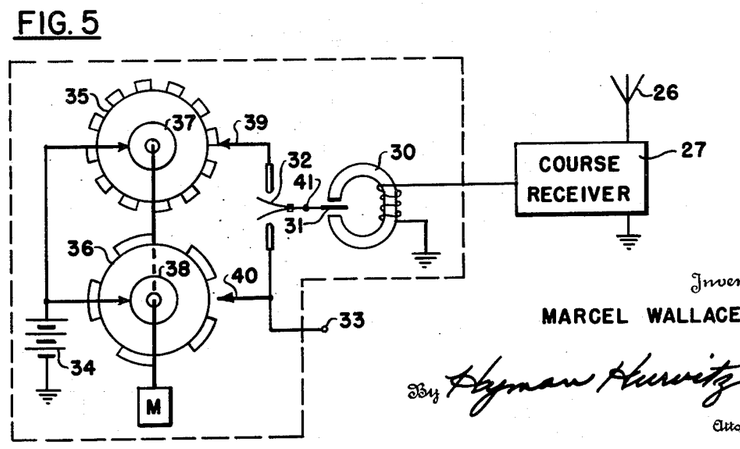
Figure 5 illustrates schematically a device including code wheels for providing keying signals to a transmitter, which are representative of course significant potentials provided by a course receiver, and which may be utilized in the embodiment of the invention illustrated in Figure 1 of the drawings.

In the present application the signals of positive and negative polarity are applied to a device, illustrated in Figure 5 of the drawings, and comprising polarized relay 30, which actuates an armature 31 in a direction dependent on the polarity of said signal. The armature 30 operates a switch 32 connecting one of two sources of modulating signals to the output 33 of the keying device.

The modulating signal sources comprise a source of potential 34, having its negative terminal grounded and its positive potential connected in parallel to a pair of coding wheels 35 and 36. Wheel 35 is provided with a series of contacts each covering a few degrees of arc, and separated by spaces covering a considerably greater arc. The wheel 36, on the other hand, is provided with a series of contacts each about three times as long as the contacts on the wheel 35 and separated by relatively short spaces.

The wheels 35 and 36 may be so constructed and arranged that the dots on wheel 35 are equal in length to the spaces on wheel 36, and the dashes on wheel 36 to the spaces on wheel 35. Further, the dots and dashes on wheels 35 and 36 respectively may be timed to interlock exactly.

Potential is applied to the wheels 35 and 33 via brushes and slip rings 37 and 38, and modulating signals are derived from the wheels 35 and 36 by means of wiper contacts 39 and 40 respectively, which are connectable selectively or simultaneously with the output terminal 33 by means of the switch 32.

Referring now again to Figure 1 of the drawing, and with the switch 16 there illustrated in open position, course signals supplied by the receiver 13 in the form of potentials of zero, positive or negative polarity may be applied to the keying signal generator 19, and may control same to provide selectively output modulating potentials in the form of a series of dots separated by dashes or alternatively a series of dashes separated by dots, the alternative outputs being indicative of right-left locations of the craft, and being supplied to the modulator 14 to modulate the output signal of the transmitter 2. Should the output of the receiver 13 be a zero potential or a small potential of either polarity, indicating a substantially on-course condition, the device 19 will provide a continuous potential to the modulator 14, enabling the transmitter to remain in continuous pulses operation.

Reviewing briefly the operation of the modification of the invention illustrated in Figure 1 of the drawings, equipments installed aboard each of a plurality of craft provide radio transmissions in the form of pulses, the pulses being equally spaced and phased at each craft with respect to a predetermined starting time in accordance with the altitude of the craft. The equipments aboard each of the craft are suitably synchronized, and provide indications of the phases of all received pulses, the indications being translatable in terms of altitude. Each craft further receives course signals from a beacon transmitter, or a series of such transmitters, located along an airway, and is provided with equipment suitable for translating the indications provided by the beacon receivers into modulations which may be superposed on the pulses transmitted by that craft. A suitable receiver-indicator aboard each craft receives the signals transmitted from all the craft and translates same into a simultaneous display of the altitudes and course positions of the various craft.

Figure 2:
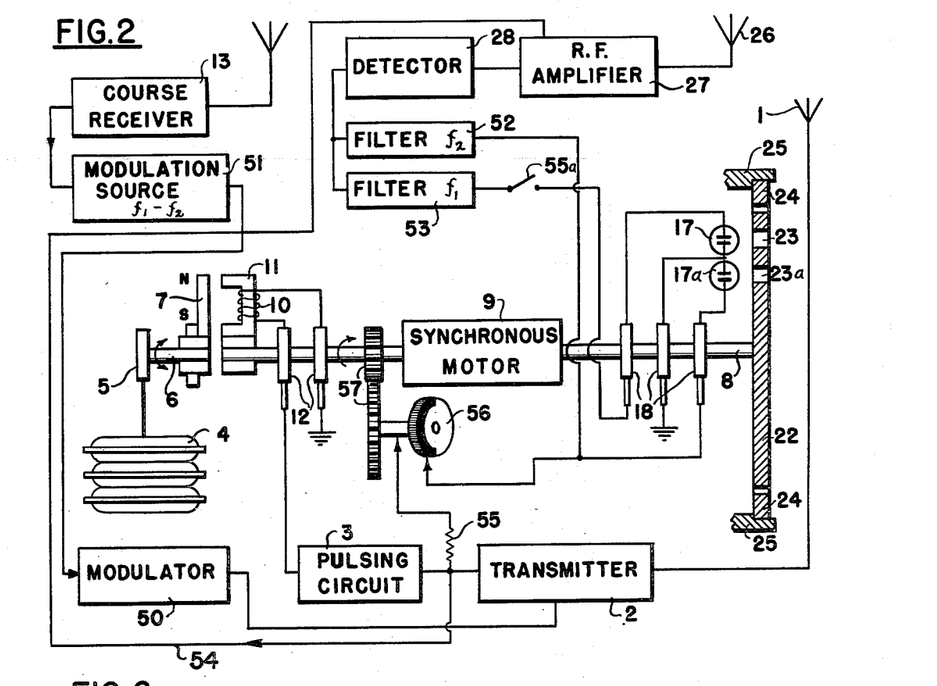
Figure 2 illustrates schematically a further embodiment of the instrument illustrated in Figure 1 but utilizing a pair of neon cells for providing indications.

Figure 2 illustrates still a further type of stratoscopic device which is supplied with means for transmitting and indicating whether each of a plurality of aircraft are traveling to the right or the left of a given course line or are substantially directly on course.

In the system of Figure 2, as in that of Figure 1, an aneroid cell or similar device 4 controls a rack 5 which positions a shaft 6 bearing a small permanent magnet 7 to an angular position which is representative of altitude.

A shaft 8, aligned with the shaft 6, is rotated by means of a drive means 9 synchronized in the various craft involved. A pick-up coil 10 supplied with a core 11 is rotated adjacent the circular path which may be described by the magnet 7 and in its transit past the magnet 7, a potential pulse is induced in the coil 10 the phase of which is representative of the position of the magnet 7 and consequently of the altitude indicated by the cell 4.

Successive pulses of voltage generated in the coil 10 in its periodic and rapid rotation are applied to a pulsing circuit 3 via suitable slip rings and brushes 12, and serve to modulate a transmitter 2, which transmits a series of relatively high radio frequency pulses for reception by all craft in the vicinity which may be properly equipped.

A beacon receiver 13 receives and detects signals indicative of the relation of the aircraft to an airway and supplies, at its output, potentials having a value and a polarity indicative of the relation of the aircraft to the course, in well known manner. The output of the receiver 13 is applied to a modulation source 51, which provides at its output modulating signals of one of two distinctive frequencies $f_1$ and $f_2$, dependent upon the side of the course occupied by the receiver 13, and of both frequencies $f_1$ and $f_2$ should the craft carrying the receiver 13 be traveling substantially directly on course. The frequency or frequencies provided by the modulation source 51 may be applied to a modulator 50, for further application to the transmitter 2, whereby each transmitted pulse may be modulated with course identifying signals $f_1$ and/or $f_2$.

Modulated pulses transmitted from a plurality of aircraft, and indicative of the altitude and course of said aircraft, may be intercepted by the antenna 26, amplified in a suitable amplifier 27 and detected in a detector 28, to derive from the received modulated carriers a series of timed modulated pulses, indicative in respect to their timing of the altitudes of the transmitting craft, and indicative in respect to the modulations on the pulses of the courses of the transmitting craft.

Connected in parallel to the output of the detector 28 is a pair of filters 52 and 53, one of which is arranged to pass only the frequency $f_1$ and the other of which is tuned to pass only the frequency $f_2$. The filter 53 is connected at its output to a neon cell 17, and the filter 52 to a neon cell 17a, via suitable slip rings and brushes 18, the cells 17 and 17a being mounted for rotation on the shaft 8.

For convenience of observation the cells 17 and 17a may be provided with a disc, secured to the shaft 8 for rotation therewith, and provided with a pair of narrow elongated slots 23 and 23a associated respectively with the cells 17 and 17a. The disc 22 rotates relatively to a reference scale 24 which may be secured to the casing 25, whereby interpretation in terms of altitude of the angular positions of the cells 17 and 17a, when illuminated, may be readily accomplished.

Reference is herewith made to the co-pending application of Wallace et al., Serial No. 633,138, filed December 6, 1945, for complete and detailed information concerning the structure of the indicator, and which is illustrated schematically in Figure 2 of the present application in sufficient detail for the purposes of the present application.

It will be apparent from the preceding description, that the cell 17 will be illuminated at an altitude indicative position in response to signals transmitted from craft on one side of a given course line and that cell 17a will be illuminated likewise for signals transmitted from craft on the other side of said course line, both cells being illuminated in response to signals originating from substantially on-course craft.

In order to avoid blocking of the receiver 27 by signals originating at the transmitter 2, a desensitizing signal is applied to the amplifier 27 via the lead 54 in accordance with well known practice, the desensitizing signal being derived from the pulser 3, and serving to reduce appreciably the gain of the amplifier 27. It is desirable, nevertheless, that signals originating in the transmitter 2 be indicated at the cells 17, 17a and that such signals be identifiable as to their point of origin.

There is, accordingly, provided a circuit from the pulser 3 via an isolating resistance 55 and a rotating switch 56, to the cell 17a. The rotating switch 56 is driven by suitable gearing 57 from the shaft 8, and rotates at a lower rate of speed than does the shaft 8, a suitable step-down ratio for the gearing being 1:2.5. The rotating switch 56 is provided with a periphery which is in part non-conducting and in part conducting, in order periodically to interrupt the circuit between the pulser 3 and the cell 17a, and because of the non-integral relation between the speed of rotation of the switch 56 and the shaft 8, the illumination of the cell 17a will be interrupted at relatively random intervals, whereby pulses originating in the transmitter 2 may be readily identified as such and distinguished from those derived from the receiver 27, these latter providing illumination continuously, in accordance with the character of the course-significant modulations impressed on the received signals.

A single-pole single throw switch 55a, connected in the output circuit of the filter 53 may be opened when it is desired to identify locally originating signals, serving to isolate the cell 17a from its normal source of signal, i. e., the filter 53, and to connect the cell 17a solely to the pulsing circuit 3 via the switch 56. Thereby one of the plurality of steady visual indications sometimes present on the face of the disc 22, and due to the cell 17a, may be supplanted by a flickering indication, upon opening switch 55, or alternatively, if the course position of the local craft should be such as to provide no modulation signal for the cell 17a, that cell will, nevertheless, be provided with a flickering signal from the pulsing circuit 3 and the rotating switch 56.

Figure 6:
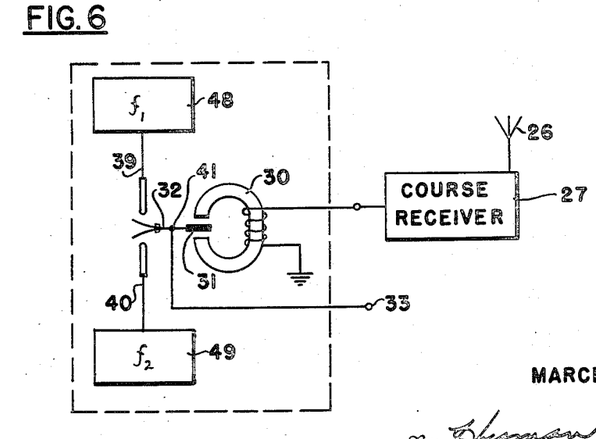
Figure 6 represents in schematic block diagram a device of the same general character as that of Figure 5, but in which high frequency modulation sources are substituted for the code wheels of Figures 5 and 6, and which may be utilized in the embodiments of the invention illustrated in Figures 3 and 4.

Referring now to Figure 6 of the drawings, there is provided a schematic circuit diagram of a modulation generator controllable in response to the output of a course receiver 27 to provide suitable modulating signals for utilization in the device illustrated in Figure 2 of the drawings, and there identified as a modulation source 51.

The output of the beacon receiver 27, and comprising a zero, positive or negative signal, in accordance with the location of the receiver with respect to a predetermined course, may be applied to a polarized relay 30 which actuates its armature 31 in a direction dependent on the polarity of the output of the beacon receiver 27.

The armature 31 actuates a switch arm 32, which in its actuated position provides a circuit to the leads 39 and 40 selectively, the latter being output leads for the signal sources 48 and 49 respectively. The signal sources 48 and 49 may be sources of alternating current of sufficiently high frequency to enable modulation of pulses transmitted by transmitter 2, of the order of 1 megacycle. The frequencies generated by the sources $f_1$ and $f_2$, further, should not be integrally related, to avoid filtering difficulties and false filter responses.

Figure 7:
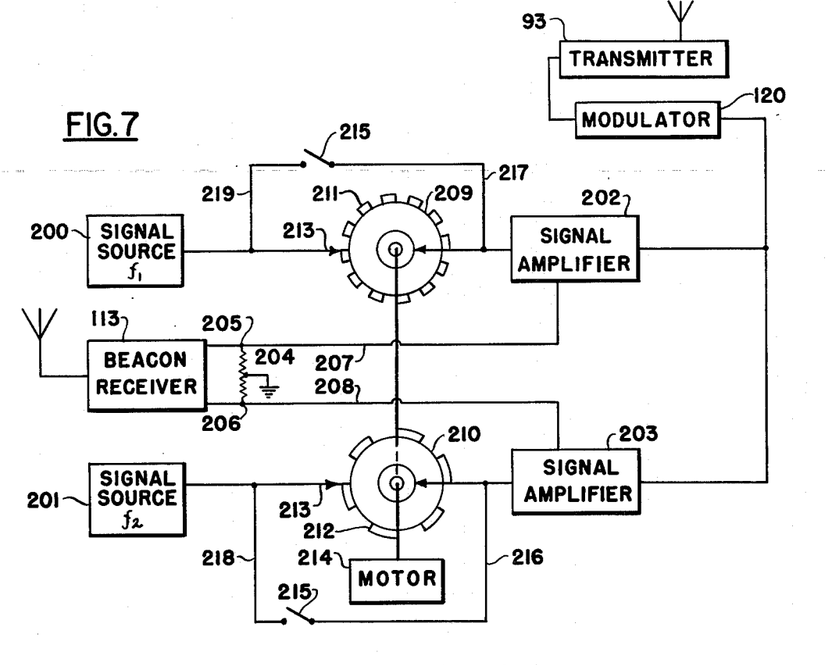
Figure 7 illustrates schematically a further embodiment of the device illustrated in Figure 6.
Figure 8:
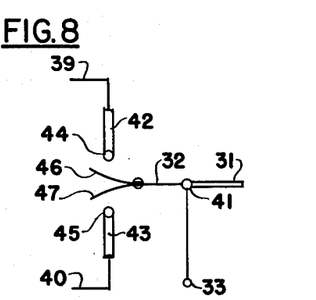
Figure 8 illustrates in detail certain of the features of the devices illustrated in Figures 5 and 6.

The construction of the switch 32 which is illustrated schematically in Figures 5 and 7 is illustrated in detail in Figure 8, which shows the armature 31 pivoted at 41 and actuating a switch arm 32 constructed of electricity conductive material. The two contacts 42 and 43 are connected to suitable leads, such as 39 and 40 are preferably constructed of copper and have tungsten or silver beads 44, 45 of hemispherical shape.

To the end of the switch arm 32 are secured a pair of diverging spring contacts 46 and 47, one of which, 46, normally contacts the head 44, the other 47, being normally in contact with the head 45. Upon actuation of the switch arm 32 by the armature 31 one of the contacts 46, 47 may be opened, the other, however, remaining in circuit closing position. By means of this expedient, it is possible to connect to the output terminal 33 either of two signal sources which may be connected to the leads 39 and 40, or both signal sources, but both sources can never be simultaneously disconnected.

The navigational systems illustrated in terms of the apparatus of Figures 1 and 2, and depending upon rotative neon cell indicators and mechanically actuated pulsers finds a counterpart in terms of pulsers and indicators of an electronic character and utilizing cathode ray tube indicators and electronically timed pulse generators, the general organization of the latter system being illustrated schematically in Figures 3, 4, 10 and 11 of the drawings.

Figure 3:
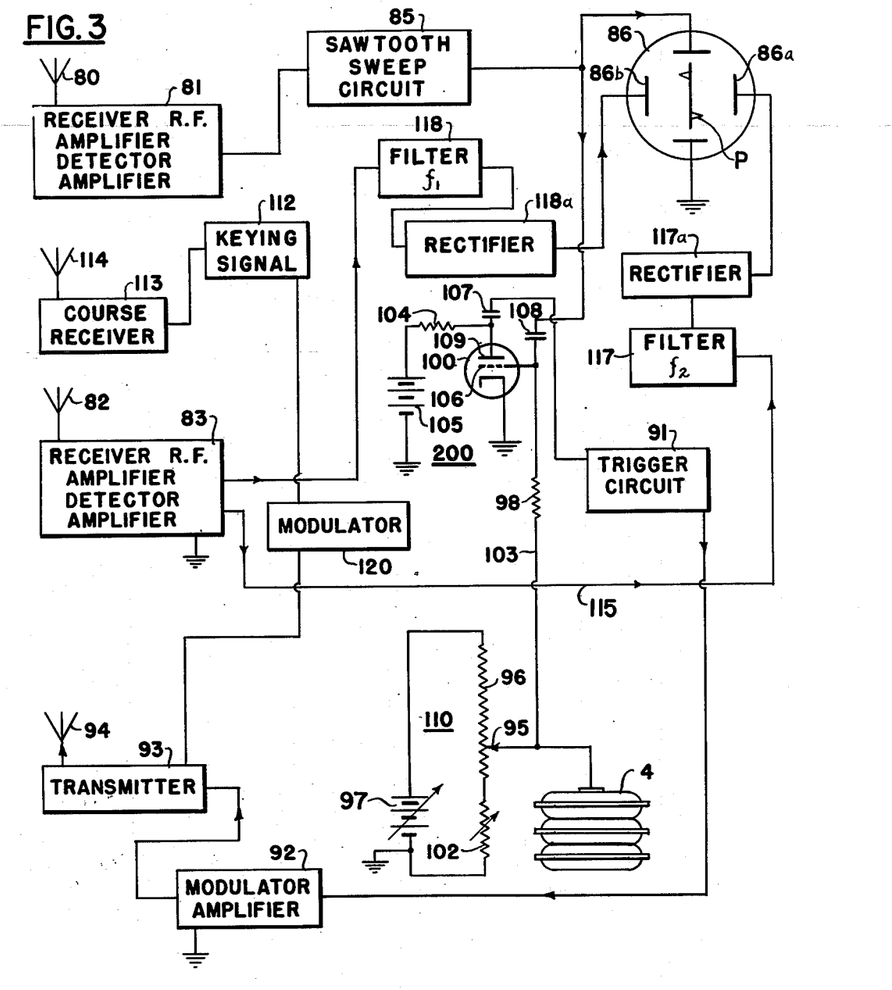
Figure 3 is a schematic block diagram of a system similar to that of Figure 1 and utilizing a cathode ray indicator for providing course and altitude indications.

Referring now to Figure 3 of the drawings, there is illustrated schematically a circuit diagram of a stratoscope system for indicating simultaneously the altitudes of a plurality of air craft as well as the positions thereof with respect to a given course, the indication being provided on the face of a cathode ray indicator 86 in terms of a series of horizontally extending pips P on a vertical trace on the indicator. Pips appearing on both sides of the trace simultaneously indicate an on course craft; pips appearing on the left of the trace indicate a craft to the left of the course and pips appearing to the right of the trace indicate a craft to the right of the course.

In the practice of my invention in accordance with the embodiment thereof illustrated in Figure 3 of the drawings, a carrier modulated with a convenient synchronizing signal is transmitted from a convenient location, which may be on the ground. The synchronizing signals are transmitted on a distinctive frequency to prevent interference with other signals used in the system, and are intercepted by the antenna 80 and suitably amplified and detected in the receiver 81. The output of the receiver 81 consists of synchronizing signals which are applied to the sawtooth sweep generator 85 to synchronize the sweep signals generated thereby and applied to the vertical plates of a cathode ray oscilloscope denominated generally by the numeral 86. The sawtooth voltage emanating from the generator 85 is similarly applied via blocking condenser 108 to the grid 106 of a tube 100 which is supplied with plate voltage from a source 105, and is plate loaded by the resistor 104. The plate 109 of the tube 100 is connected via coupling condenser 107 to the input of a trigger circuit 91 which supplies short pulses to the amplifier 92 for application as modulating signals to the transmitter 93, having an antenna 94.

The tube 100 is normally biased back beyond cutoff by a potentiometer circuit, denominated generally by the numeral 110 and comprising the battery 97 or other voltage source, grounded at its positive terminal, and connected in series with a pair of resistors 96 and 102, the latter being variable, to enable adjustment of the system to provide a zero indication at sea level. The contact 95 rides over the resistor 96 and taps therefrom a negative voltage which is proportional to altitude, the contact 95 being actuated by an aneroid cell 4 or its equivalent. The adjustable resistor 102 serves to set up a minimum negative bias corresponding with sea level.

The sawtooth voltage provided by the generator 85 and applied to the grid 106 of the tube 100 is of positive polarity, and is adapted to overcome the negative potential normally present at the contact 95 at some point in its growth cycle, the relative time in the cycle at which the opposing voltages balance being determined by the magnitude of the negative bias to be overcome, and said relative time being thus a measure of altitude. As the cut-off bias on the grid 106 of the tube 100 is removed plate current flows in the tube and a signal is applied via condenser 107 to the trigger circuit 91 to trigger same to produce a signal pulse.

It will be recognized that a plurality of craft, each equipped similarly with synchronized sawtooth generators 85, will provide each a series of periodic equally spaced pulses the relative times of transmission of which with respect to the synchronizing pulse provided by the receiver 81, and which is common to all the craft, is in correspondence with the altitudes of the transmitting craft.

The transmitter 93 aboard each craft is not only pulse modulated by altitude significant pulses, but each pulse contains further tone or tones modulation provided by a tone keyer 112, corresponding in detail with either of the tone keyers illustrated schematically in Figures 5 or 7 of the drawings, and controlled by a beacon receiver 113 having an antenna 114.

Received altitude and course significant signals are received on an antenna 82 and suitably amplified and detected in the receiver 83. Output signals in the form of short spurts of tone are applied to one horizontal deflecting plate 86a via line 115, tone filter 117 and rectifier 117a, and to the other horizontal plate 86b via the line 116, the filter 118 and the rectifier 118a. The filters 117 and 118 respectively may be designed to pass frequencies $f_1$ and $f_2$.

The face of the cathode ray indicator 86 will provide, in accordance with the arrangements described and illustrated, a vertical altitude trace, having right and left pips for aircraft which are traveling directly on course, pips to the right of the altitude line for craft on the right of the course line, and pips on the left of the altitude line for craft on the left of the course. The vertical positions of the pips are indicative of the altitude of the various craft, and the face of the indicator 86 may be suitably calibrated to enable this quantity to be read off directly.

While I have illustrated in Figures 5 and 6, and described in preceding portions of the specification, certain forms of modulation generators, responsive to beacon signals, one of which is suitable for establishing and interrupting pulse sequences, whereas the other is suitable for modulating each transmitted pulse with an accompanying alternating current signal, it will be recognized that the systems heretofore described are mechanical circuit makers and breakers in character and present no possibility of providing course indicators capable of providing information of the extent to which the various craft employing the system may be off course.

Figure 4:
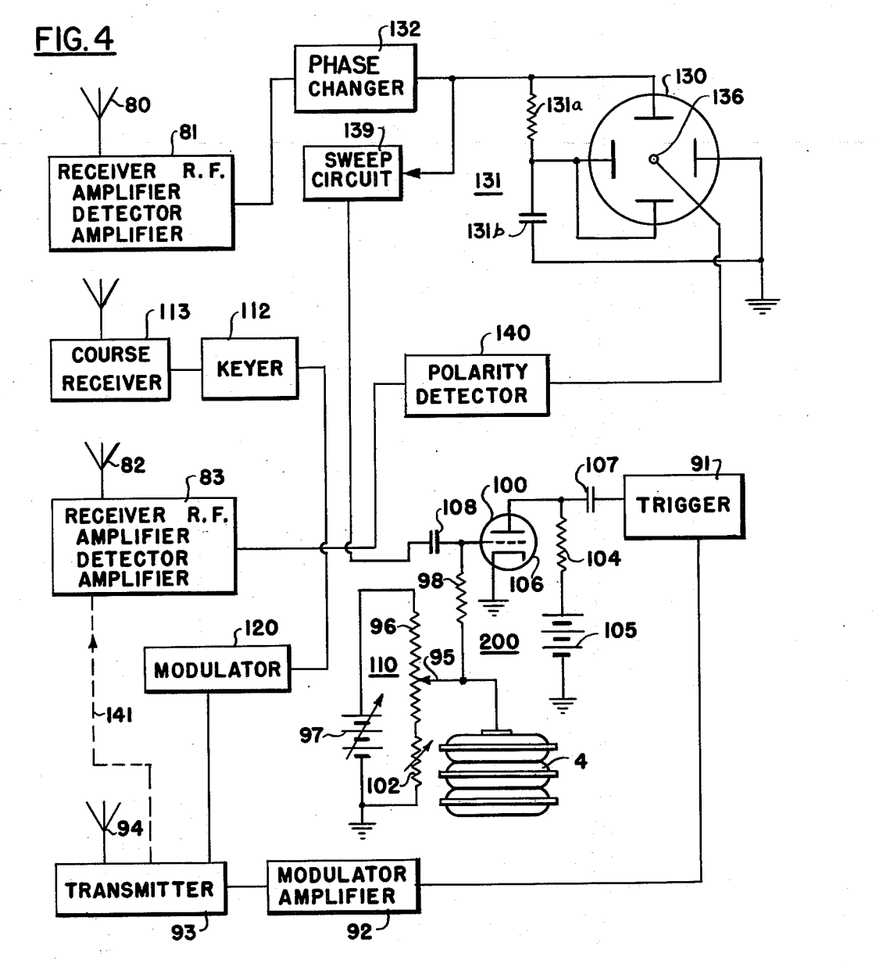
Figure 4 is a schematic block diagram of a further embodiment of the invention illustrated in Figure 3, in which course and altitude indications are provided on a circular trace on the face of a cathode ray indicator.
Figure 10:
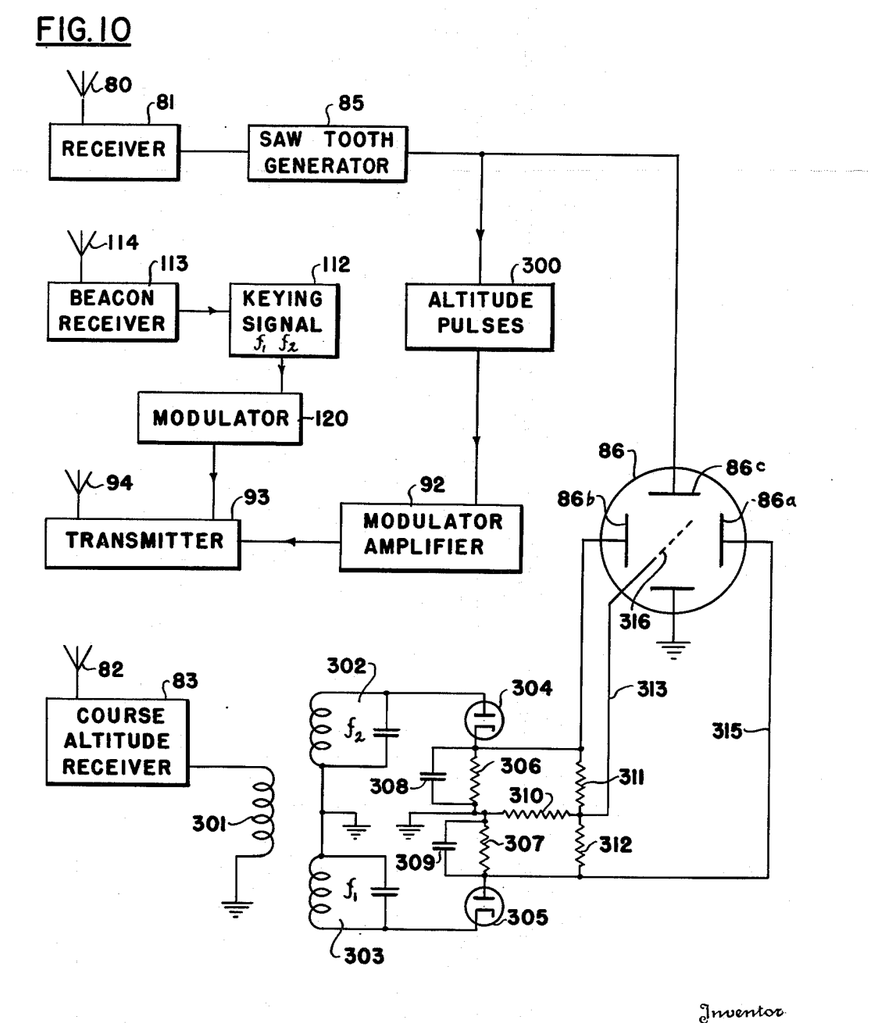
Figure 10 illustrates largely in block diagram a modification of the embodiment of the invention illustrated in Figure 3 of the drawings, and providing indications of the extent to which each of a plurality of craft may be off course.
Figure 11:
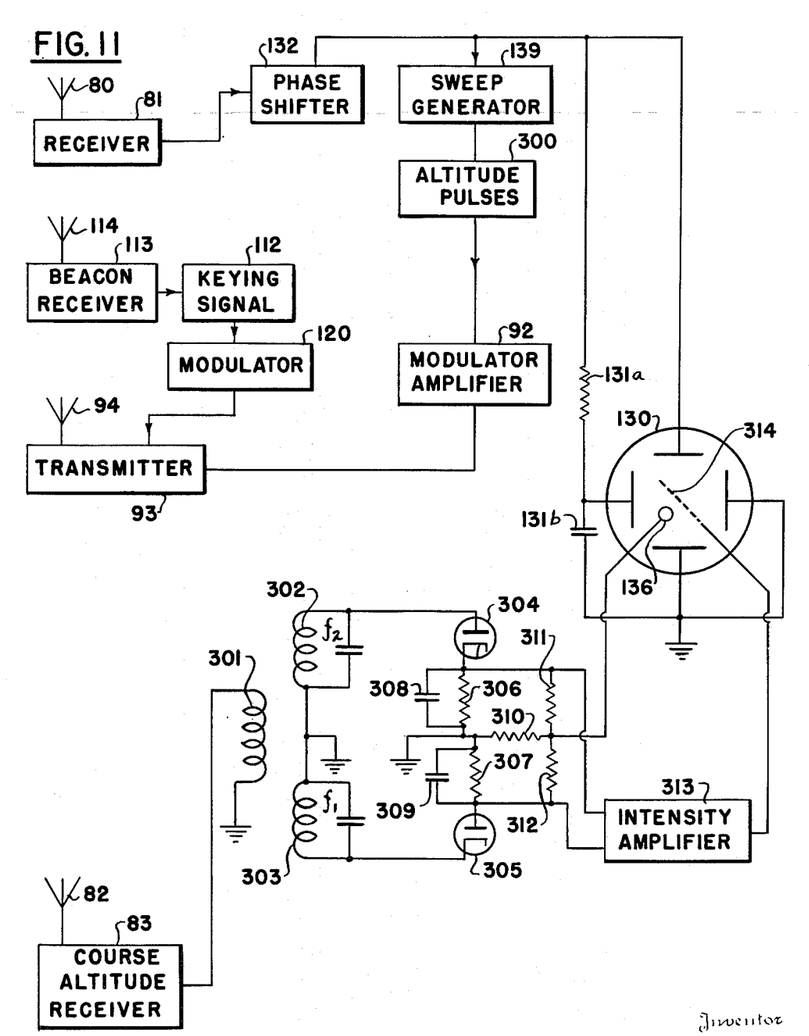
Figure 11 illustrates largely in block diagram a modification of the embodiment of the invention illustrated in Figure 4 of the drawings, and providing indications of the extent to which each of a plurality of craft may be off course provided by one or more suitable beacon transmitters.

Modifications of the systems illustrated in Figures 3 and 4 of the drawings, and utilizing a novel keying circuit illustrated in Figure 7 of the drawings, as the keyer 112 of Figures 3 and 4, enables transmission and indication of signals representative of the extent to which aircraft are off course. Embodiments of such systems are illustrated in Figures 10 and 11 of the drawings, respectively, the source of keying signal 112 provided in the output of the beacon receivers 113 of Figures 10 and 11 corresponding with the device schematically illustrated in Figure 7 of the drawings.

Referring now specifically to Figure 7 of the drawings, there is illustrated the beacon receiver 113 having connected across its output a resistor 204, having its central point grounded and providing at its end points 205 and 206 potentials of respectively opposite polarity, the specific polarity assignable to the points 205 and 206, as well as the magnitude of the potentials, being dependent upon the location of the receiver 113 with respect to a predetermined beacon course established in terms of overlapping radio beams by means of a suitable beacon transmitter.

A pair of signal sources 200, 201 generate respective signal frequencies $f_1$ and $f_2$ of equal amplitudes, each of which may be distributed in two distinct paths to the respective signal amplifiers 202, 203. Upon closure of manually operable switches 215, the code wheels 209, 210 may be short circuited by the leads 217, 219 and 216, 218 respectively, and the outputs of the signal sources 200 and 201 applied directly to the input terminals of the amplifiers 202 and 203.

With switches 215 open signals generated by sources 200 and 201 are applied to the signal amplifiers 202 and 203 respectively after being chopped by the code wheels 209 and 210. The latter code wheels are provided one with a series of spaced dots 211 and the other with a series of spaced dashes 212, so arranged with respect to one another as to provide interlocking signals to the amplifiers 202 and 203.

The voltages provided at the end points 205, 206 of the resistor 204 are applied as gain control potentials respectively to the amplifiers 202 and 203 via leads 207 and 208, whereby the amplitudes of the signal outputs provided by the signal amplifiers 202 and 203 are differentially controlled in accordance with the output of the beacon receiver 113.

Since, in the embodiment of the invention illustrated in Figure 3 of the drawings, as well as in the embodiment illustrated in Figure 4 thereof, the magnitude of the pips corresponding to course indications is dependent on the magnitude of the signals utilized to produce the pips, it will be clear that utilization of signal sources 112 of the character illustrated in Figure 7 of the drawings in the systems disclosed in Figures 3 and 4 of the drawings, will enable indication of the extent of deviation of aircraft from a predetermined course to be presented in these systems.

In Figure 4 of the drawings, I have illustrated an embodiment of my invention which utilizes a polar type of cathode ray indicator, altitudes being indicated in terms of location of pips on a circular trace. Right, left indication is provided in terms of inward and outward pip deflections respectively, on course being indicated by simultaneous inward and outward pips.

In the embodiment illustrated in Figure 4 of the drawings, the receiver 81 having an antenna 80 is utilized for receiving and demodulating a carrier modulated with a low frequency pure sine wave, preferably of about 60 cycles as well as a synchronizing pulse at the same frequency. The demodulated sine wave signal is applied to the plates of a polar cathode ray tube 130 via a circuit 131 comprising resistor 131a and condenser 131b, arranged to provide a rotary sweep of the beam of the cathode ray indicator 130. The various aircraft equipped with apparatus constructed in accordance with the embodiment of Figure 4 of the drawings are, in this manner provided with synchronized circular sweeps. Each individual craft may vary the relative phase of its sweep by means of the phase changer 132 interposed between the receiver 81 and the phase splitting circuit 131, in order to align pulses originating in the transmitter 91 of the local craft with the zero of a circular scale calibrated in terms of altitude, whereby all other signals representative of the altitudes of foreign or remote aircraft may be indicated in terms of altitude relative to the local craft, rather than in terms of absolute altitude.

In order to provide assurance of accurate synchronizations of the sweep circuit voltages, aboard all the craft and to provide indications of absolute altitude, the start of the sweep circuit voltage may be aligned with a zero marker on the face of the indicator by adjusting the phase shifter 132 until the winning synchronizing pulse is aligned with the said marker, as explained in the co-pending application of Wallace et al., No. 633,138 filed December 6, 1945.

Pulse signals present in the output of the receiver 81 are applied to control a sawtooth wave generator 139, initiating successive sawtooth sweep voltages which are synchronized and in phase for all craft utilizing the system.

The sawtooth wave generated by the generator 139 is applied, as in Figure 3 of the drawings, to a potentiometer arrangement 110, comprising voltage source 97 in series with resistors 96 and 102, the positive terminal of the voltage source being grounded, and a variable tap 95 being provided to apply negative bias voltage to the grid 106 of the tube 100. The position of the tap 95 is controlled to be representative of altitude, being actuated by an aneroid cell or similar device 4. The voltage provided by the sweep circuit generator 139 serves to balance the negative bias of the potentiometer circuit 110, at a point in the growth curve of the sawtooth voltage which is determined by altitude, the tube 100 thereupon becoming conductive and transmitting a signal to the trigger circuit 91 via the blocking condenser 107 to course the trigger circuit 91 to generate a pulse of voltage. The output of the trigger circuit 91 is applied to the modulator amplifier 92 which controls the transmission from the radio transmitter 93, the latter comprising the antenna 94.

Since a plurality of craft utilizing the present system may be similarly equipped, each craft will transmit a signal timed, with respect to the synchronizing pulse supplied to all the craft, so as to indicate altitudes of the craft. The short spurts of R. F. signal transmitted by the transmitter 93 may be further modulated by signals derived from a keying generator 112 and applied to the transmitter 93 via the modulator.

The internal structure of the keying generator 112 is adequately indicated in Figure 5 of the drawings, the device being arranged as has been heretofore explained, to provide tone modulation of one frequency upon reception of course signals in the course receiver 113 originating on one side of a given radio course, and of a radically different frequency upon reception of course signals originating on the other side of the said course. On course signals are represented by both signals simultaneously.

The tone modulated and pulsed R. F. signals transmitted by each of the plurality of craft involved in the system are received in a receiver 83 having an antenna 82, and are applied to a polarity detector which provides an output signal applicable to the polar electrode 136 of the cathode ray indicator 130, to provide inward or outward pips on the circular trace on the screen of the indicator 130 in response respectively to tone frequency $f_1$ or $f_2$. Should both tone frequencies be present both an inward and an outward pip will be presented.

The polarity detector is a device suitable for producing pulsating direct current output of polarity which depends upon frequency. One embodiment of a suitable device for accomplishing this purpose is illustrated schematically in Figure 9 of the drawings.

Figure 9:
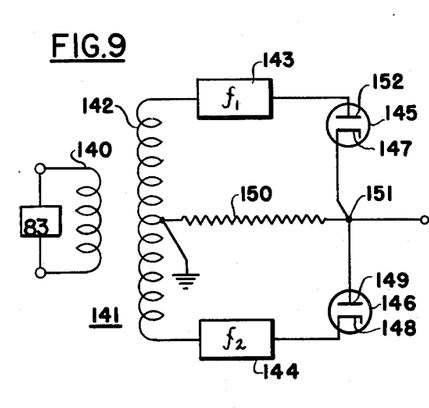
Figure 9 is a circuit diagram of a discriminator circuit utilizable in the embodiments of the invention illustrated in Figures 3 and 4 of the drawings, and there illustrated in block diagram.

Referring now specifically to Figure 9 of the drawings, primary 140 of transformer 141 may be connected to the output of the receiver 83, the secondary coil 142 of the transformer 141 being connected at its ends to filters 143 and 144, which pass tone signals $f_1$ and $f_2$ only, the output sides of the filters 143 and 144 being connected in series with a pair of diodes 145, 146 and having the cathode 147 of the tube 145 connected to the plate 149 of the tube 146. The junction point 151 between cathode 147 and plate 149 is connected to the center point of the secondary winding 142 and there grounded. The point 151 is connected to the polar electrode 136 of the indicator 130.

It will be obvious that reception of signals at frequency $f_1$ will result in positive potential with respect to ground at the point 151, whereas reception of signals at frequency $f_2$ will result in negative potential with respect to ground at point 151. Reception of both signals $f_1$ and $f_2$ simultaneously will not, however, result in a balanced potential at the point 151 because of the difference in frequencies of the applied signals, and the output at point 151 will consist of a potential having an alternating character.

The polar electrode 136, in response to negative pulses, produces an outward pip in the circular trace on the face of the indicator, and an inward pip in response to a positive pulse. Alternating potential produces a double pip, extending inwardly and outwardly.

Referring now specifically to Figure 10 of the drawings, there is illustrated in schematic block diagram an instrument useful in navigational systems for providing indications of the altitudes and courses of a plurality of aircraft, each of the aircraft transmitting pulses timed in accordance with altitude and modulated in accordance with relation of the craft to a predetermined radio course line defining an airway and provided by means of one or more radio beacon systems.

In the navigational system employing the instrument illustrated in Figure 10 of the drawings, synchronizing pulsed radio signals provided by a ground station to all aircraft utilizing the system are received in the receiver 81, provided with an antenna 80, and there amplified and detected to provide output pulses for application to the sawtooth generator 85 for purposes of synchronization. The sawtooth sweep voltage produced by the generator 85 may be applied to the vertical plates 86c of a cathode ray indicator 86, to produce a vertical trace on the face thereof in correspondence with the sweep voltage. The trace referred to may be de-intensified to be vanishingly light or may be rendered completely invisible by the bias grid 316 of the tube 86, which is grounded normally by means of the lead 313.

The sweep voltage is likewise applied to the altitude pulser 300, which may be substantially a duplicate of that illustrated in detail in Figures 3 and 4 of the drawings, and causes generation of pulses timed to correspond with the altitude of the instrument. Pulses provided by the device 300 are applied to modulator 92 to cause pulsed transmission of a radio-frequency carrier from the transmitter 93, having an antenna 94.

The transmitted pulses are further modulated with signals provided by a modulator 120, controlled by a beacon receiver 113 and a keying signal source 112, the specific circuit details of which are illustrated in Figure 7 of the drawings, and which has been fully described in preceding portions of the specification.

Modulated pulse signals emanating from each of a plurality of aircraft and representative of the altitudes and courses of said aircraft are received in a suitable course-altitude receiver 83 having an antenna 82, and are there suitably amplified and demodulated to produce spurts of modulation $f_1$ and/or $f_2$, timed to correspond with altitude, the modulation intensities or amplitudes of signals $f_1$ and $f_2$ being representative of course deviations of the craft originating the signals.

The modulation signals $f_1$ and $f_2$ present in the output of the receiver 83 are applied to a transformer primary 301, for inductive transfer to a pair of series connected tuned secondary coils, 302 and 303, peaked respectively at the frequencies $f_2$ and $f_1$, and having their junction point grounded.

Across the secondary windings 302 and 303 are connected a pair of diodes 304 and 305 in push-push relation, the cathodes of the diodes 304, 305 being interconnected by resistors 306, 307 having their common point grounded, the resistors being by-passed for modulation frequencies $f_1$ and $f_2$ by the condensers 308 and 309.

The cathodes of the diodes 304 and 305 are further interconnected by means of a pair of resistors 311, 312 connected in series, and the common point of which is connected to ground via a resistor 310.

A D. C. pulse voltage will be developed across the resistor 310, proportional to the arithmetic sum of the pulse voltages developed across the resistors 311 and 312, in obvious manner, and this voltage may be applied via lead 313 to the intensifier grid 316, to produce a visible or intensified dot on the face of the indicator schematically represented at 86.

The D. C. voltages produced at the resistors 311 and 312 respectively are indicative each of the amplitude of the modulating signals $f_1$ and $f_2$, and these voltages are applied to the horizontal plates 86b and 86c respectively, to produce a deflection the magnitude and direction of which depends upon the relative amplitudes of the voltages. Should the signals $f_1$ and $f_2$ be of equal amplitudes, indicative of an on course condition, the D. C. potentials applied to the plates 86b and 86c will balance and produce no deflections. Intensification will, however, be produced in any event, whence an undeflected dot may be considered indicative of an on-course condition of the craft aboard which the signals originate.

In still another embodiment of the invention, illustrated schematically in Figure 11 of the drawings, signals transmitted from a ground station and modulated with a low frequency sine wave signal suitable for establishing a rate of rotation for cathode ray indicator 130, as well as with a pulse synchronizing signal for the instruments aboard the various aircraft, is received on the receiver 81.

The receiver 81 abstracts from the received carrier wave the superimposed sine wave modulation as well as the pulse, applying same to an adjustable phase shifter 132 which may serve to vary the phase of the low frequency modulation without affecting the pulse.

The pulse may be applied to sweep generator 139, as in Figure 10 of the drawings, and serves, as has been heretofore explained to produce pulses time modulated in accordance with altitude for transmission by transmitter 113 and antenna 94. The pulses are further modulated with keying signals provided by a keying signal source 112, under the control of a beacon receiver 113.

The low frequency modulation provided at the output of the phase shifter 132 is applied to a phase splitting circuit comprising resistor 131a and capacitor 131b in series, the voltages which are applied to the vertical and horizontal plates of the cathode ray indicator 130, to produce a circular trace. The starting point of the trace may be aligned with the occurrence of the synchronizing pulse by adjusting phase changer 132, to align a pip produced by the pulse with a point of reference corresponding to zero altitude on a suitably calibrated circular scale.

Pulses received at the antenna 82 are detected in course-altitude signal receiver 83, the modulation frequencies on the pulses being transferred by primary coil 301 connected in the output of receiver 82 to tuned secondary coils 302 and 303 which may be tuned to frequency $f_2$ and $f_1$ respectively so that secondary 303 passes only signals of frequency $f_1$, while secondary 302 passes only signals of frequency $f_2$.

The signals present in the secondaries 302, 303 are rectified by diodes 304 and 305, which are connected cathode-to-plate, in series, a load resistor 306 by-passed for frequency $f_2$ by capacitor 308 being provided for the diode 304, and a similar load resistor 307, by-passed for frequency $f_1$ by capacitor 309 being provided for diode 305.

Connected across resistors 306 and 307 is a like pair of resistors 311 and 312, connected in series, the point of junction of the resistors 306, 307 being connected to the point of junction of the resistors 311, 312 by means of a resistor 310.

The voltage existing across the resistors 311, 312 in series will be at all times additive and proportional to the arithmetic sum of the magnitudes of the signals $f_1$ and $f_2$.

On the other hand the potential existing across the resistor 310 is compounded of a difference of two potentials occasioned by current flow in the tubes 304 and 305, and hence is proportional to the algebraic difference between the magnitudes of the signals $f_1$ and $f_2$.

The voltage across the resistors 311 and 312 in series is amplified in the amplifier 313 and thence applied as intensifier signal to the intensifier grid 314 of the tube 130, which normally is biased just short of cutoff, so as to provide but a faint trace on the face of the cathode ray tube 130. Intensifying voltage from the amplifier 313 is of pulse duration, and results in production of bright dots in the faint trace, to indicate the presence of signals.

Voltage derived from the junction point of resistors 311 and 312 is applied to the polar electrode 136 of cathode ray indicator 130 to produce inward or outward deflections in the circular trace on the face of indicator 130 in accordance with whether the resultant or difference polarity across resistor 310 is negative or positive, the magnitude of the deflection being proportional to the magnitude of the applied voltage.

Should the magnitudes of signals $f_1$ and $f_2$ be equal, the potential applied to the polar electrode 136 will be zero resulting in an undeflected but intensified indication on the face of the indicator, this condition obviously corresponding to an on-course indication.

The relationship between the embodiments illustrated in Figures 3 and 10, and between the embodiments illustrated in Figures 4 and 11 will be obvious, the primary distinction residing in the utilization of intensifying techniques in the embodiments illustrated in Figures 10 and 11 of the drawings, the traces provided on the indicators of Figures 3 and 4 of the drawings being of constant intensity.

While I have described a number of specific embodiments of my invention, it is obvious that modifications may be made in the general arrangement and combination of each of the embodiments, and that equivalents may be substituted for various of the elements and sub-combinations illustrated and described, without departing from the spirit of the invention or the scope of the appended claims.

What I claim and desire to secure by Letters Patent of the United States is:

1. A navigational system comprising unitary means for indicating the altitudes of each of a plurality of craft, and said unitary means comprising further means for indicating the lateral positions of said plurality of craft with respect to a predetermined course.

2. A navigational system comprising means for simultaneously indicating the altitudes of each of a plurality of craft, and means for simultaneously indicating the relation of each of said plurality of craft to a predetermined course line.

3. A navigational system comprising means located on an aircraft for transmitting pulse signals phased to be representative of altitude and means for modulating said pulse signals to be representative of the location of said aircraft laterally with respect to a predetermined course line.

4. A navigational system comprising means for receiving aboard one aircraft signals each from a plurality of aircraft, said signals being modulated in respect to both altitude and course of an aircraft, and a single indicator for simultaneously visually indicating the altitudes and courses represented by said plurality of signals.

5. A navigational system comprising means for receiving aboard an aircraft signals representative of the position of said aircraft relative to a predetermined course line, means aboard said aircraft for generating pulses carrier, means for timing said pulses in accordance with altitude of said aircraft, means for modulating said pulses in response to signals received by said means for receiving.

6. A navigational system comprising means aboard an aircraft for transmitting pulse time modulated signals indicative in respect to their pulse timing of the altitude of said aircraft and further modulated in accordance with the position of said aircraft with respect to a predetermined course line, and means for receiving and translating said signals into visual indications each representative of both said altitude and said position of one of said aircraft.

7. A navigational system comprising means aboard each of a plurality of aircraft for transmitting altitude and course significant signals, and a receiver indicator for receiving and translating said signals into a simultaneous display of the altitudes and courses of said plurality of aircraft.

8. A navigational system comprising means aboard at least one aircraft for transmitting altitude and course significant signals, and a single indicator means located remotely from said at least one aircraft for translating both said altitude and said course significant signals into a single indication representing simultaneously both altitude and course.

9. A navigational system comprising means aboard at least one aircraft for transmitting altitude and course significant radio signals, and cathode ray receiver indicator means located remotely from said aircraft for receiving and translating said signals to provide indications of the altitude and course signified thereby.

10. A navigational system comprising means for transmitting signals defining a predetermined course, means aboard each of a plurality of aircraft for receiving and translating said signals to provide course significant indications, a radio transmitter aboard each of said plurality of aircraft for transmitting position reporting signals, means for modulating said position reporting signals with altitude significant modulations and with further modulations controlled by said course significant indications, means aboard each of said plurality of aircraft for receiving said position reporting signals transmissions from said radio transmitters aboard each of said plurality of aircraft and for translating said modulations into substantially simultaneous unitary indications of the relative altitudes and courses of said plurality of aircraft.

11. A navigational system in accordance with claim 10 in which said means for translating said modulations comprises a cathode ray indicator.

12. A navigational system in accordance with claim 11 in which said means for translating said modulations comprises a rotating neon cell.

13. A navigational system for aircraft comprising a transmitter aboard an aircraft, means for pulse modulating said transmitter with pulses timed to represent altitude of said aircraft, means for modulating said pulses with signals significant of course flown by said aircraft, remote means for receiving said pulses and for providing altitude significant indications in response thereto, and means for modifying said altitude significant indications to indicate said course.

14. A navigational system in accordance with claim 13 in which said means for pulse modulating said transmitter comprises a magnetic element positionable on the arc of a circle in accordance with altitude, and a further magnetic element mounted for rotation adjacent said circle.

15. A navigational system in accordance with claim 13 in which said means for modulating said pulses comprises a beacon receiver and means responsive to the output of said beacon receiver for generating said course significant signals significant of course flown by said aircraft.

16. A navigational system in accordance with claim 13 in which said means for providing altitude significant indications comprises a cathode ray tube indicator, and means for modifying said altitude significant indications comprising a circuit responsive to said signals significant of course.

17. A navigational system in accordance with claim 13 in which said means for providing altitude significant indications comprises a cathode ray indicator having means for producing a cathode ray and for controlling the intensity of said ray, means normally reducing said intensity, and means controlled by said means for receiving for increasing said intensity in response to each of said pulses.

18. A navigational system in accordance with claim 13 in which said means for providing altitude significant indications comprises a cathode ray indicator having means for producing a cathode ray and for controlling the intensity of said ray, means normally reducing said intensity, and means responsive to reception of signals by said means for receiving for increasing said intensity, and in which said means for modulating said altitude significant indications comprises means for deflecting said ray.

19. A navigational system in accordance with claim 13 in which said means for providing altitude significant indications comprises a cathode ray tube indicator having means for producing a circular trace on the face of said indicator and means for modulating said trace.

20. A navigational system for transmitting from each of a plurality of aircraft signals having a characteristic significant of altitude, means aboard each of said aircraft for modulating altitude significant signals transmitted therefrom with further signals significant of lateral positions of said craft relative to a predetermined course, a receiver aboard each of said aircraft for receiving said first mentioned signals modulated by said further signals, and a single indicator aboard each of said craft responsive to each of said receivers for translating said first mentioned signals and said further signals into unitary indications of altitude and lateral position of each of said aircraft.

21. In combination, means for establishing a similar periodically recurrent time base at each of a plurality of stations, means at each of said plurality of stations for generating a signal timed with respect to said time base in accordance with a value of measurable quantity, an indicator at each of said stations for indicating timing of signals with respect to said time base, means for transmitting said signals from each of said stations to the remainder of said stations, and means at each station for receiving signals from the remainder of said stations and for applying said signals to the indicator at said each station, and further means at each of said stations for measuring a further measurable quantity, and for modulating said signal timed with respect to said time base in accordance with said measurement of said further quantity, said indicator at each of said stations comprising means for indicating said value of said further measurable quantity.

22. In combination, a first cathode ray tube indicator having means for generating a cathode ray beam and an indicating surface visually responsive to impact by said beam, means for recurrently and periodically causing said cathode ray beam to scan said indicating surface, said last means comprising a source of saw-tooth voltage, means for measuring the magnitude of a first physical quantity, means responsive to said last means comprising a source of saw-tooth voltage proportional to said magnitude, means resonsive jointly to said saw-tooth voltage and to said direct current voltage for generating a first pulse timed in accordance with said magnitude, first means for transmitting said first pulse to a remote location, a second cathode ray tube at said remote location having means for generating a cathode ray beam and an indicating surface visually responsive to impact by said cathode ray beam, means for recurrently and periodically causing said second named cathode ray beam to scan said second named indicating surface, said last means comprising a source of saw-tooth voltage, means for measuring the magnitude of a further physical quantity at said remote location, means responsive to said last means for establishing a direct current voltage proportional to said magnitude, means responsive jointly to said last named saw-tooth voltage and to said last named direct current voltage for generating a further pulse timed in accordance with said magnitude of a further physical quantity, means for transmitting said further pulse from said remote location, means at said first cathode ray tube indicator responsive to said second pulse for modulating said cathode ray beam of said first cathode ray tube, means at said second location responsive to said first mentioned pulse for modulating said second cathode ray beam, and means for synchronizing said means for recurrently and periodically causing said cathode ray beams to scan said indicating surfaces, means for modulating said first pulse in accordance with the value of still a further measurable quantity, means for modulating said further pulse in accordance with still another measurable quantity, means at said first cathode ray tube indicator responsive to said modulation for still further modulating said cathode ray beam of said first cathode ray tube, and means at said second location responsive to modulation of said first mentioned pulse for still further modulating said second named cathode ray beam.

23. In combination, a cathode ray tube indicator having an indicating surface, means for establishing recurrent traces on said surface, means responsive to initiation of each of said traces for generating a saw-tooth voltage, means for measuring the magnitude of a physical quantity and for establishing a voltage proportional to said magnitude, means responsive to said last mentioned voltage and to said saw-tooth voltage for generating a pulse at a time during said recurrent trace which is representative of said magnitude, means for transmitting said pulse to a remote point, and means at said remote point for indicating said magnitude, means for measuring the magnitude of a further physical quantity and for establishing a modulation signal representative of said further physical quantity, and means for modulating said pulse in accordance with said further physical quantity, said means at said remote point for indicating said magnitude comprising means for simultaneously indicating said further magnitude.

24. In combination, means for establishing corresponding mutually synchronized periodically recurrent time bases at each of a plurality of aircraft, means aboard each of said aircraft for generating pulses timed with respect to said time bases in accordance with the altitude of said aircraft, means for modulating said pulses in accordance with deviations of said aircraft from a predetermined course, an indicator means on each of said aircraft for indicating timing of pulses with respect to said time base, and deviations from said course, as a unitary indication, means for transmitting said pulses from each of said aircraft to the remainder of said aircraft, and means at each of said aircraft for receiving said pulses from the remainder of said aircraft and for applying said signals to said indicator at each of said aircraft, visually to indicate the relative altitudes of said plurality of aircraft, and the deviations of said aircraft from said predetermined course.

25. In combination, means for establishing a similar periodically recurrent time base at each of a plurality of stations, means at each of said stations for generating signals timed with respect to said time base in accordance with the value of a first measurable quantity, means at each of said stations for generating modulating signals representative of the value of a second measurable quantity, means for modulating said first mentioned signals with said further signals, an indicator at each of said stations for indicating as a unitary indication the timing of signals applied thereto with respect to said time base and the value of said further measurable quantity as determined by said modulating signal, means for transmitting said signals modulated by said means for modulating from each of said stations to the remainder of said stations, means at each of said stations for receiving said transmitted signals, and means for applying signals received at each station to said indicator at each station.

26. A method of telemetric communication from a plurality of stations to a central station, comprising the steps of: establishing a common time base at said plurality of stations and at said central station; generating a pulse at each of said plurality of stations, each of said pulses having a time position with respect to said common time base which is indicative of the value of a measurable quantity, modulating said pulses in a manner which is indicative of the value of a further measurable quantity, establishing a correspondence between time positions along said common time base and points along a line in space at said central station, indicating the time positions of each generated pulse at said central station by reference to said line in space, and indicating the value of said further measurable quantity in terms of a visual modification of indications representative of the time positions of each generated pulse at said central station.

MARCEL WALLACE.

REFERENCES CITED

The following references are of record in the file of this patent:

UNITED STATES PATENTS

| Number | Name | Date |
| --- | --- | --- |
| 2,042,490 | Zahl | June 2, 1936 |
| 2,090,359 | Robinson | Aug. 17, 1937 |
| 2,279,246 | Podliasky et al. | Apr. 7, 1942 |
| 2,288,196 | Kramar | June 30, 1942 |
| 2,307,029 | Elm | Jan. 5, 1943 |
| 2,312,203 | Wallace | Feb. 23, 1943 |
| 2,378,604 | Wallace | June 19, 1945 |
| 2,396,112 | Morgan | Mar. 5, 1946 |
| 2,401,432 | Luck | June 4, 1946 |
| 2,403,603 | Korn | July 9, 1946 |
| 2,405,231 | Newhouse | Aug. 6, 1946 |
| 2,405,238 | Seeley | Aug. 6, 1946 |
| 2,408,048 | Deloraine et al. | Sept. 24, 1946 |
| 2,411,520 | Capen | Nov. 26, 1946 |
| 2,419,525 | Alford | Apr. 29, 1947 |
| 2,421,017 | Deloraine | May 27, 1947 |